Jan. 23, 1968     H. EBERS     3,364,966
APPARATUS FOR REMOVING THE SQUEEZE-OUT
FROM RUBBER TIRES

Filed May 26, 1966     2 Sheets-Sheet 1

United States Patent Office 3,364,966
Patented Jan. 23, 1968

3,364,966
APPARATUS FOR REMOVING THE SQUEEZE-OUT FROM RUBBER TIRES
Heinz Ebers, Seelze, Germany, assignor to Continental Gummi-Werke Aktiengesellschaft, Hannover, Germany
Filed May 26, 1966, Ser. No. 553,203
Claims priority, application Germany, June 1, 1965, C 36,003
6 Claims. (Cl. 157—13)

The present invention relates to the removal of squeeze-out from rubber tires as it forms on the tires where the mold sections in which the tire is formed meet. This squeeze-out is generally removed from the finished tire by special machines in which the tire is rotated and is passed by knives which cut off the protruding squeeze-out. More specifically, machines developed for this operation comprise an L-shaped support in which the tire is suspended and by means of which the tire is introduced into the machine in a direction transverse to its machining position while guiding and driving rollers in the machine serve for clamping and turning the tire to be trimmed. The tire, which is moved through the machine in vertical position, is engaged by at least three driving and guiding rollers of which those rollers which carry the tire represent guiding rollers exclusively, whereas the remaining rollers function as driving and guiding rollers. Those rollers which are exclusively designed as guiding rollers and carry the tire are movabe into a passage in the machine, whereas the upper driving and guiding rollers are journalled stationarily so that when the tire is clamped in between the rollers it will be lifted off its supporting means and will be free for rotation.

When trimming tires of different diameters, the machining position of the knives with regard to the central axis of the tire differs. With large tires, the machining knives are with regard to the central axis of the tire located at a higher level than is the case with small tires so that in order always to have the cutting knives located in their proper position, it would be necessary to adjust the cutting knives in conformity with each respective size of the tire.

It is an object of the present invention to provide an apparatus for removing the squeeze-out of rubber tires, which will overcome the above mentioned drawbacks.

It is another object of this invention to provide an apparatus for removing the squeeze-out from rubber tires, in which the tires will by means of the guiding and driving rollers be moved into their proper position for the cutting tools regardless of the respective diameter of the tire.

These and other objects and advantages of the invention will appear more clearly from the following specification in connection with the accompanying drawings, in which.

Figure 1:
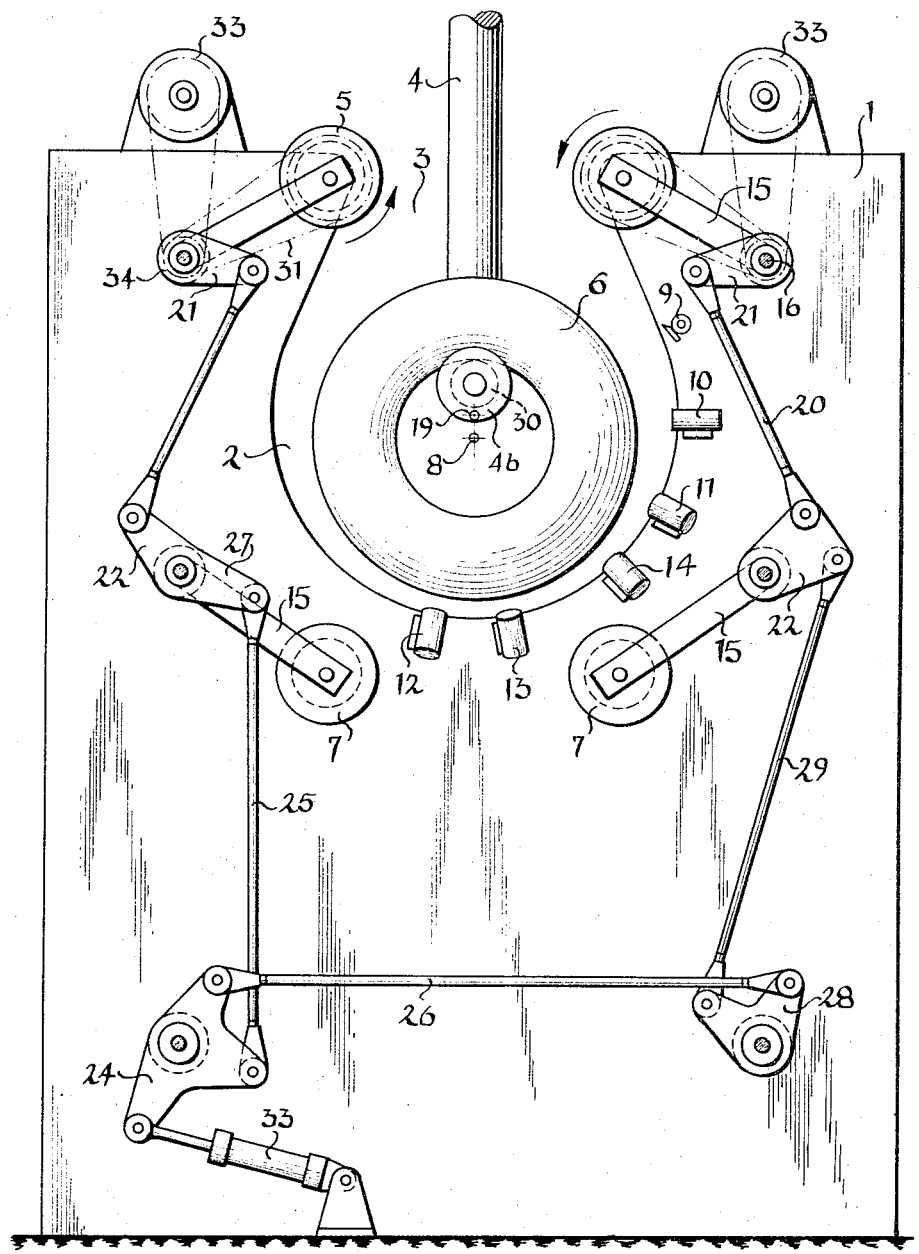
FIG. 1 represents an apparatus according to the present invention with a tire moved into the passage provided in said apparatus for receiving the tire during the trimming off of the squeeze-out.

The apparatus according to the present invention is characterized primarily in that the guiding and driving rollers are arranged so as to be movable in at least approximately radial direction with regard to a common axis of rotation for the tire to be trimmed while the radial distances of said rollers from the said common axis are at least approximately the same.

More specifically, the tires are regardless of their diameters, always brought into such a position that their axis of rotation with regard to the apparatus and with regard to the passage in the apparatus and in particular with regard to the cutting tools will be constant.

According to a further development of the present invention, the axis of rotation of the tire to be trimmed is during the trimming operation located somewhat higher than the central axis of the tire when the latter is suspended on its support. This difference in the location between the central axis of the tire suspended on its support and the axis of rotation of the tire during the trimming operation is not critical because already less than a centimeter will suffice to lift the tire from its support for the trimming operation, whereas the maximum difference is easily realized by the operator in view of the free inner opening of the tire. In practice, approximately one-tenth of the medium tire diameter is selected for the distance between the central axis of the tire in suspended position thereof and its axis of rotation during the trimming operation.

The guiding and driving rollers may be displaceably arranged on carriages which are radially movable toward the axis of rotation of the tire during its trimming operation. However, for simplifying the structure of the apparatus, it is suggested according to the present invention, to guide the guiding and driving rollers along circular arc sections. In this connection, it is advantageous to provide one-arm levers the free ends of which have journalled thereon the guiding and driving rollers which in response to the movements of the levers describe circular arc sections directed substantially to the axis of rotation of the tire during the trimming operation. In view of this arrangement, the driving and guiding rollers can easily and at low expenses be moved in the direction toward the axis of rotation of the tire during the trimming operation because for purposes of maintaining a constant position of this axis of rotation, the constant strokes of the rollers with regard to each other are of great importance in addition to the direction of movement of the said rollers. The levers for guiding the driving and guiding rollers are according to a further development of the present invention arranged at both sides of the passage for the tire in the apparatus. In this position, the shafts are located closest to each other and can be drivingly interconnected at the lowest expenses for instance by gears, belts, chain drives or the like.

According to a still further development of the present invention, the levers are interconnected by coupling linkage means so that the guiding and driving rollers will during their movement along the circular arc sections move over equal distances. These coupling linkage means may be actuated in unison by a hydraulic cylinder piston system.

Referring now to the drawings in detail, the apparatus illustrated therein comprises a machine frame 1 the upper portion of which is provided with a somewhat circularly-shaped cutout or passage 2 which at its upper end merges with a passage 3. The device furthermore comprises a support 4 the upper portion of which is connected to a conveyor (not shown) of any standard type while the lower portion of support 4 comprises a horizontal roller or arm 30 with a circular flange 4b at its end for receiving and supporting a tire 6 the squeeze-out of which has to be trimmed. At opposite sides of passages 2 and 3 there are provided the driving and guiding rollers 5 for the tire 6. Opposite the passage 3 are located the guiding rollers 7. The central axis of the tire 6 when the latter is suspended on arm 30 of the supporting member 4 is designated with the reference numeral 8 and is located somewhat lower than the horizontal central axis of the passage 2. FIG. 1 furthermore shows the machining knife 9 at the marginal area of passage 2 and in retracted position for the central tread surface, while the knives 10 for the rounded shoulder of the tire are designated with the reference numeral 10 and the knives 12 and 13 represent the trimming knives for the lateral portions of the tread surface. All of the trimming knives are adapted following the clamping in of tire 6 between the guiding and driving rollers 5, 7 to be moved toward tire 6 so that they enter passage 2. For the trimming of the beaded zones, additionally knives 14 may be provided.

Figure 2:
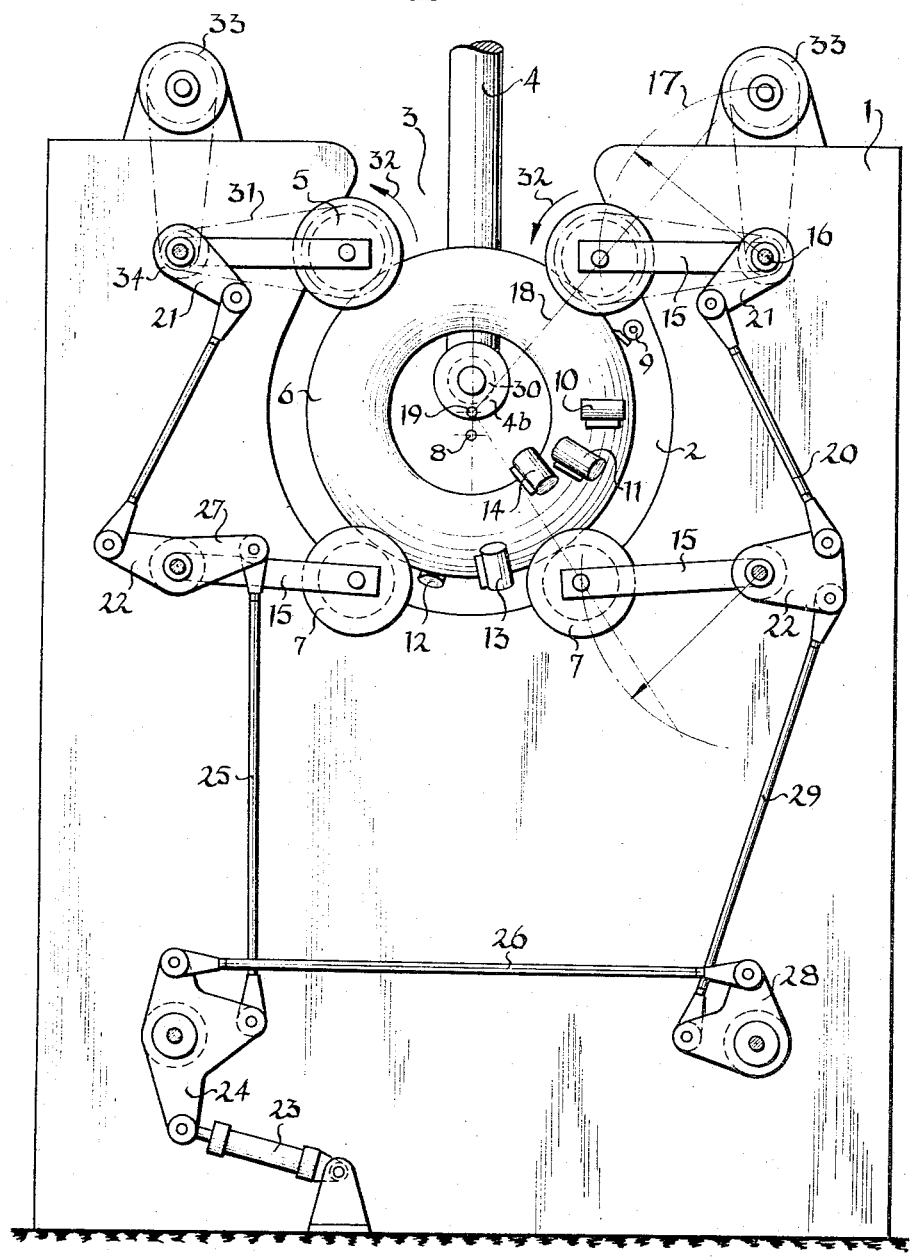
FIG. 2 shows the apparatus according to FIG. 1 in its working position.

The driving and guiding rollers 5, 7 are journalled on levers 15 which are tiltable about the axes of shafts or pivots 16 so that the central axes of the guiding and driving rollers 5, 7 move along the circular arc sections 17 (see FIG. 2). The circular arc sections 17 are close to the radial lines 18 which intersect in the axis of rotation 19 of the tire 6 when the tire is in its trimming position. Shafts 16 are in pairs interconnected by the coupling rods 20 in such a way that when a lever 15 is actuated, also the other levers 15 will while moving over the same distance be moved approximately in the direction toward the axis of rotation 19. To this end, the linkage system of the apparatus according to the present invention comprises lever members 21 and 22. The movement of the levers 15 is brought by a hydraulic cylinder piston system 23 which is operatively connected to a T-shaped lever 24 and actuates the coupling bars 25 and 26. Coupling bar 25 is linked to the two-arm lever 27 and thus is able to move the two guiding and driving rollers 5, 7 on the left-hand side of passage 2 (with regard to the drawing), whereas the coupling bar 26 is linked to angle lever 28 and is operable to change the direction of movement and through coupling bar 29 to actuate the driving and guiding rollers 5, 7 on the right-hand side of the passage 2 (with regard to the drawing).

As soon as the cylinder piston system 23 of the machine according to FIG. 1 is being actuated in one direction, all driving and guiding rollers 5, 7 will move over the same distance toward the tire 6 introduced into passage 2 and will clamp the same therebetween at four points. The guiding and driving rollers 5, 7 have a concave running surface whereby the tire will be laterally guided during its rotation. Inasmuch as the strokes and the directions of the guiding and driving rollers are adjusted for the axis of rotation 19 of the tire during the trimming operation, the tire will when being clamped be slightly lifted so that the tire will be lifted off the horizontal arm 30 while the central axis 8 of the tire will then coincide with the axis 19. After the trimming operation, the guiding and driving rollers 5, 7 will by actuating the cylinder piston system 23 in the opposite direction return to their starting position so that the tire 6 will be lowered again upon the roller 30 and its central axis will again be located where indicated in FIG. 1. The guiding rollers 7 at the two lower levers 15 are rotatably journalled and substantially support the load or weight of the tire 6 while also being able to furnish the clamping pressure during the trimming operation. The driving rollers 5 on opposite sides of passage 3 are designed similar to the guiding rollers 7, however, they are drivingly connected by a belt or chain drive 31 to motors 33 on opposite sides of passage 3 so that the driving rollers 5 are adapted to be driven in the direction of the arrows 32. The drive of the guiding rollers 5 is effected through a transmission 34 which is coaxially arranged on shafts 16 and permits any desired angular position of levers 15.

The guiding and driving rollers 5, 7 are in the particular embodiment shown in the drawings offset with regard to each other by 90° but, if three rollers are employed, may be offset with regard to each other by 120°. For purposes of adapting the arcs 17 as far as possible to the lines 18, the levers 15 are selected as long as possible, because with a flatter arc 17, the path of movement of the guiding and driving rollers 5, 7 becomes more precise. The distance between the central axis 8 of the tire 6 when being suspended on roller 30, and the axis of rotation 19 of the tire 6 during the trimming operation is advantageously to be selected as one-tenth of the diameter of a tire 6 representing the medium size tire which can be trimmed on the machine.

The guiding of the driving and guiding rollers 5, 7 is not limited to the specific arrangement of levers 15 nor to the specific arrangement of the coupling bars because the equal movement and the direction of movement of the guiding and driving rollers 5, 7 can also be realized by other generally known devices.

It is also to be understood that the present invention is, by no means, limited to the particular arrangement shown in the drawings but also comprises any modifications within the scope of the appended claims.

What I claim is:

1. An apparatus for trimming vehicle tires of rubber material to remove squeeze-out therefrom, which includes: frame means having a passage therein to receive a tire to be trimmed in upright position thereof, guiding and driving roller means arranged on opposite sides of and adjacent to said passage and substantially equally spaced from an axis about which the tire to be trimmed is to be rotated during a trimming operation while the tire is in said passage, means operatively connected to said guiding and driving roller means for selectively substantially evenly moving the same in a direction at least approximately radially toward and away from said axis, and cutting means supported by said frame means adjacent said passage for cutting off the squeeze-out of a tire in said passage.

2. An apparatus according to claim 1, which includes suspending means having a substantially horizontal arm operable to receive and support a tire to be trimmed and operable to introduce the tire into said passage so that the axis of the tire will be below said first mentioned axis about which the tire to be trimmed is to be rotated during the trimming operation.

3. An apparatus according to claim 1, in which the guiding and driving roller means are movable along arc sections directed approximately to the axis about which the tire is to be rotated during a trimming operation.

4. An apparatus according to claim 1, which includes lever means respectively rotatably supporting said driving and guiding roller means and pivotable so as to cause the roller means supported thereby to move along circular arc sections directed at least approximately toward the axis about which the tire is to be rotated during a trimming operation.

5. An apparatus according to claim 4, which includes shaft means on opposite sides of said passage and pivotally supporting said lever means.

6. An apparatus according to claim 4, which includes linkage means interconnecting said lever means and operable to move the roller means on all of said lever means by the same distance along circular arc sections directed at least approximately toward the axis about which the tire to be trimmed is to be rotated.

References Cited

UNITED STATES PATENTS

| 2,788,851 | 4/1957 | Rawls et al. | 157—13 |
| 2,852,073 | 9/1958 | Rawls et al. | 157—13 |
| 3,260,297 | 7/1966 | Ebers | 157—13 |

GRANVILLE Y. CUSTER, JR., *Primary Examiner.*